United States Patent
Walker et al.

(10) Patent No.: US 10,563,533 B2
(45) Date of Patent: Feb. 18, 2020

(54) REPAIR OR REMANUFACTURE OF BLADE OUTER AIR SEALS FOR A GAS TURBINE ENGINE

(71) Applicant: United Technologies Corporation, Hartford, CT (US)

(72) Inventors: David E. Walker, Rochester, NH (US); Richard M. Gregoire, Wells, ME (US)

(73) Assignee: United Technologies Corporation, Farmington, CT (US)

( * ) Notice: Subject to any disclaimer, the term of this patent is extended or adjusted under 35 U.S.C. 154(b) by 449 days.

(21) Appl. No.: 14/913,156

(22) PCT Filed: Sep. 10, 2014

(86) PCT No.: PCT/US2014/054975
§ 371 (c)(1),
(2) Date: Feb. 19, 2016

(87) PCT Pub. No.: WO2015/038637
PCT Pub. Date: Mar. 19, 2016

(65) Prior Publication Data
US 2016/0208634 A1    Jul. 21, 2016

Related U.S. Application Data

(60) Provisional application No. 61/877,707, filed on Sep. 13, 2013.

(51) Int. Cl.
*F01D 11/08* (2006.01)
*F01D 5/00* (2006.01)
(Continued)

(52) U.S. Cl.
CPC .......... *F01D 11/08* (2013.01); *F05D 2220/32* (2013.01); *F05D 2230/235* (2013.01); *F05D 2230/80* (2013.01)

(58) Field of Classification Search
CPC ...................................................... F01D 5/005
See application file for complete search history.

(56) References Cited

U.S. PATENT DOCUMENTS 4,822,248 A   4/1989  Wertz et al.
4,924,581 A   5/1990  Jakobsen
(Continued)

FOREIGN PATENT DOCUMENTS

WO    WO03048528    6/2003

OTHER PUBLICATIONS

American Welding Society, AWS Structural Welding Code, 2003, 19th Edition, Cover pages, Abstract, p. 190.*
(Continued)

*Primary Examiner* — Igor Kershteyn
*Assistant Examiner* — John S Hunter, Jr.
(74) *Attorney, Agent, or Firm* — Getz Balich LLC (57) ABSTRACT

A method of remanufacturing a turbine component is provided. This method includes removing a donor portion from a damaged component; removing a to-be-replaced portion from a serviceable component generally equivalent to the donor portion leaving a remainder; and welding the donor portion to the remainder. A BOAS for a gas turbine engine is also provided that includes a serviceable BOAS with a donor portion from a damaged BOAS welded thereto.

10 Claims, 10 Drawing Sheets

(51) Int. Cl.
*B23K 101/00* (2006.01)
*B23P 6/00* (2006.01)
*F01D 25/24* (2006.01)

(56) References Cited

U.S. PATENT DOCUMENTS

| | | | |
|---|---|---|---|
| 6,742,698 | B2 | 6/2004 | Shah et al. |
| 6,916,387 | B2 | 7/2005 | Lulofs |
| 7,472,478 | B2 | 1/2009 | Graham et al. |
| 7,597,533 | B1 | 10/2009 | Liang |
| 7,653,995 | B2 | 2/2010 | Morin |
| 7,704,039 | B1 | 4/2010 | Liang |
| 7,797,828 | B2 | 9/2010 | Beeson et al. |
| 7,858,897 | B2 | 12/2010 | Beranger |
| 8,061,979 | B1 | 11/2011 | Liang |
| 8,153,922 | B2 | 4/2012 | Belanger |
| 8,299,389 | B2 | 10/2012 | Belanger |
| 8,439,634 | B1 | 5/2013 | Liang |
| 8,449,246 | B1 | 5/2013 | Liang |
| 2001/0052375 | A1 | 12/2001 | Sievers et al. |
| 2009/0175727 | A1* | 7/2009 | Bischof ............ B23K 20/02 416/179 |
| 2009/0214335 | A1 | 8/2009 | Long |
| 2011/0000084 | A1 | 1/2011 | Lange |
| 2012/0027574 | A1 | 2/2012 | Belanger et al. |

OTHER PUBLICATIONS

Advantage Fabricated Metals, TIG Welding, Mar. 2, 2004.*
The Fabricator, How to perform tack welding successfully, Dec. 23, 2010.*
Erika Winters-Downey, Reclaimed Structural Steel and LEED Credit MR 3—Materials Reuse, May 2010.*
EP search report for EP14844815.2 filed Sep. 30, 2016.

* cited by examiner

REPAIR OR REMANUFACTURE OF BLADE OUTER AIR SEALS FOR A GAS TURBINE ENGINE

CROSS-REFERENCE TO RELATED APPLICATION

This application claims priority to PCT Patent Application No. PCT/US2014/054975 filed Sep. 10, 2014, which claims priority to U.S. Provisional Application No. 61/877,707 filed Sep. 13, 2013, which are hereby incorporated herein by reference in their entireties.

BACKGROUND

The present disclosure relates to a gas turbine engine and, more particularly, to a cooling arrangement therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The combustor section produces a circumferential temperature pattern referred to as a pattern factor that results in hot and cold streaks in the turbine section. Stationary components such as Blade Outer Air Seals operate at the local pattern temperature and may eventually need to be replaced multiple times over the engine service life. Replacement is relatively expensive such that there are often considerable economic incentives to repair these components. Typically, these repairs are performed with an Oxidation Resistant Braze composition over the pattern factor damage. These repairs, although effective when achieved, typically have a relatively low yield with significant non-repairable component scrap out rates.

SUMMARY

A method of remanufacturing a turbine component, according to one disclosed non-limiting embodiment of the present disclosure, includes removing a donor portion from a damaged component; removing a to-be-replaced portion from a serviceable component generally equivalent to the donor portion leaving a remainder; and welding the donor portion to the remainder.

In a further embodiment of the present disclosure, the damaged component and the serviceable component are both blade outer air seals (BOASs).

In a further embodiment of any of the foregoing embodiments of the present disclosure, the donor portion and the to-be-replaced portion are at least partially taken from shiplap tabs.

In a further embodiment of any of the foregoing embodiments of the present disclosure, the remainder is at least partially formed by shiplap tab.

In a further embodiment of any of the foregoing embodiments of the present disclosure, the donor portion is a top portion of a shiplap tab.

In a further embodiment of any of the foregoing embodiments of the present disclosure, the to-be-replaced portion is a top portion of a shiplap tab.

In a further embodiment of any of the foregoing embodiments of the present disclosure, the donor portion and the to-be-replaced portion are non-structural.

In a further embodiment of any of the foregoing embodiments of the present disclosure, the method includes tack welding the donor portion to the remainder and then TIG welding the donor portion to the remainder after tack welding.

A method of remanufacturing a BOAS, according to another disclosed non-limiting embodiment of the present disclosure, includes removing a donor portion from a shiplap tab of a damaged component; removing a to-be-replaced portion from a shiplap tab of a serviceable component generally equivalent to the donor portion leaving a remainder of the shiplap tab; and welding the donor portion to the remainder of the shiplap tab of the serviceable component.

In a further embodiment of any of the foregoing embodiments of the present disclosure, the donor portion is a top portion of the shiplap tab.

In a further embodiment of any of the foregoing embodiments of the present disclosure, the to-be-replaced portion is a top portion of the shiplap tab.

In a further embodiment of any of the foregoing embodiments of the present disclosure, the method includes tack welding the donor portion to the remainder.

In a further embodiment of any of the foregoing embodiments of the present disclosure, the method includes TIG welding the donor portion to the remainder after tack welding.

In a further embodiment of any of the foregoing embodiments of the present disclosure, the method includes TIG welding around the entire perimeter of the donor portion to the remainder after tack welding.

In a further embodiment of any of the foregoing embodiments of the present disclosure, the method includes blending the weld.

A BOAS for a gas turbine engine, according to another disclosed non-limiting embodiment of the present disclosure, includes a serviceable BOAS with a donor portion from a damaged BOAS welded thereto.

In a further embodiment of any of the foregoing embodiments of the present disclosure, the damaged BOAS is unserviceable.

In a further embodiment of any of the foregoing embodiments of the present disclosure, the donor portion is a portion of a shiplap tab.

In a further embodiment of any of the foregoing embodiments of the present disclosure, the donor portion is tack welded and TIG welded to a portion of a shiplap tab of the serviceable BOAS.

In a further embodiment of any of the foregoing embodiments of the present disclosure, the donor portion is non-structural.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
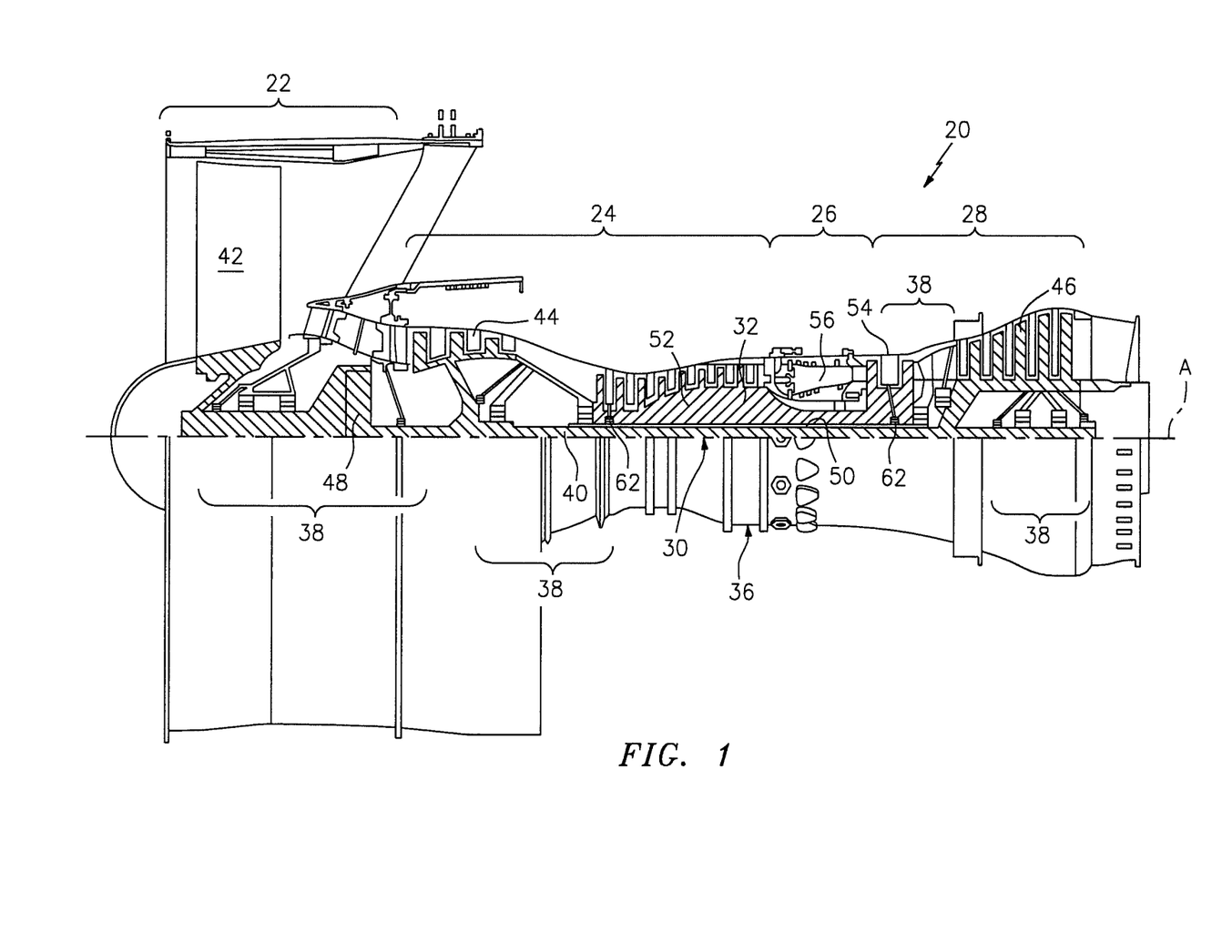
FIG. 1 is a schematic cross-section of one example gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. Although depicted as a turbofan in the disclosed non-limiting embodiment, it should be appreciated that the concepts described herein are not limited to use with turbofans as the teachings may also be applied to other types of turbine engines such as turbojets, turboshafts, industrial gas turbines, and three-spool (plus fan) turbofans with an intermediate spool.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 (see FIG. 1) to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by the bearing structures 38 within the case structure 36.

Figure 2:
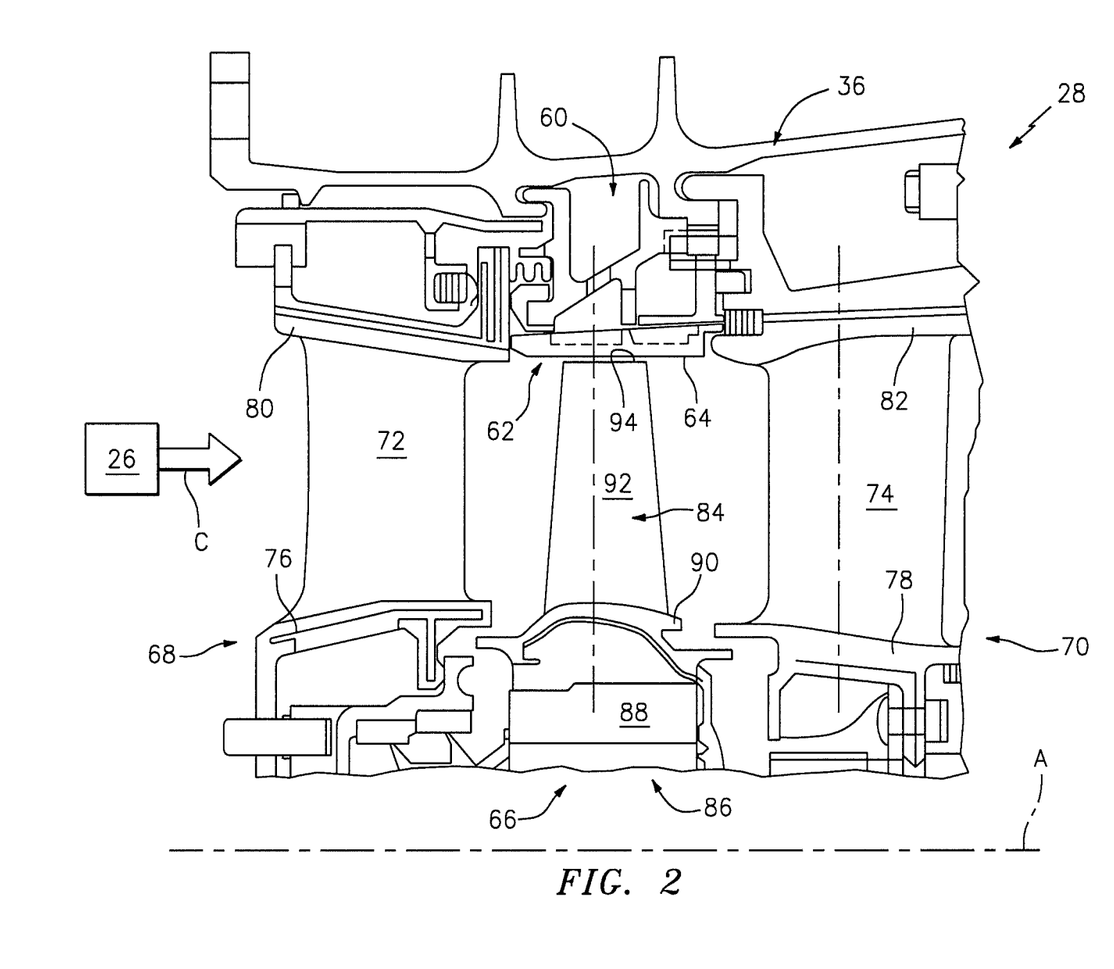
FIG. 2 is an is an enlarged schematic cross-section of a turbine section with a blade outer air seal (BOAS) assembly.

With reference to FIG. 2, an enlarged schematic view of a portion of the turbine section 28 is shown by way of example; however, other engine sections will also benefit herefrom. A shroud assembly 60 within the engine case structure 36 at least partially supports a blade outer air seal (BOAS) assembly 62 with a multiple of BOASs 64 proximate to a turbine blade rotor assembly 66 (one schematically shown). It should be appreciated that the shroud assembly 60 may be circumferentially segmented or otherwise configured to receive and retain the multiple of BOASs 64.

The shroud assembly 60 and the BOAS assembly 62 are axially disposed between a forward stationary vane assembly 68 and an aft stationary vane assembly 70. Each vane assembly 68, 70 includes an array of vanes 72, 74 (one shown) that extend between a respective inner vane support 76, 78 and an outer vane support 80, 82. The vane supports 76, 78, 80, 82 may be attached to the engine case structure 36 in various manners.

The rotor assembly 66 includes an array of blades 84 (one shown) circumferentially disposed around a disk 86. Each blade 84 includes a root 88, a platform 90 and an airfoil 92. The blade roots 88 are received within a rim of the disk 86 and the airfoils 92 extend radially outward such that a tip 94 of each airfoil 92 is adjacent the BOAS assembly 62.

Combustion gases produced in the combustor section 26 (indicated schematically by arrow C) expand in the turbine section 28 and produce pressure gradients, temperature gradients and vibrations. The BOASs 64 are supported with respect to the shroud assembly 60 to provide for relative movement to accommodate the expansion caused by changes in pressure, temperature and vibrations encountered during operation of the gas turbine engine 20. The combustion gases C also produce a circumferential temperature pattern referred to as a pattern factor that results in hot streaks and cold streaks around the circumference of the turbine section 28 proximate the BOASs 64, inner vane supports 76, 78 and outer vane supports 80, 82. The BOASs 64, the inner vane support 76, 78, the outer vane support 80, 82 and other rotationally fixed components in the turbine section 28 are defined herein as static turbine component exposed to relatively constant hot streaks and cold streaks due to the pattern factor which, over time, may damage these components.

Figure 3:
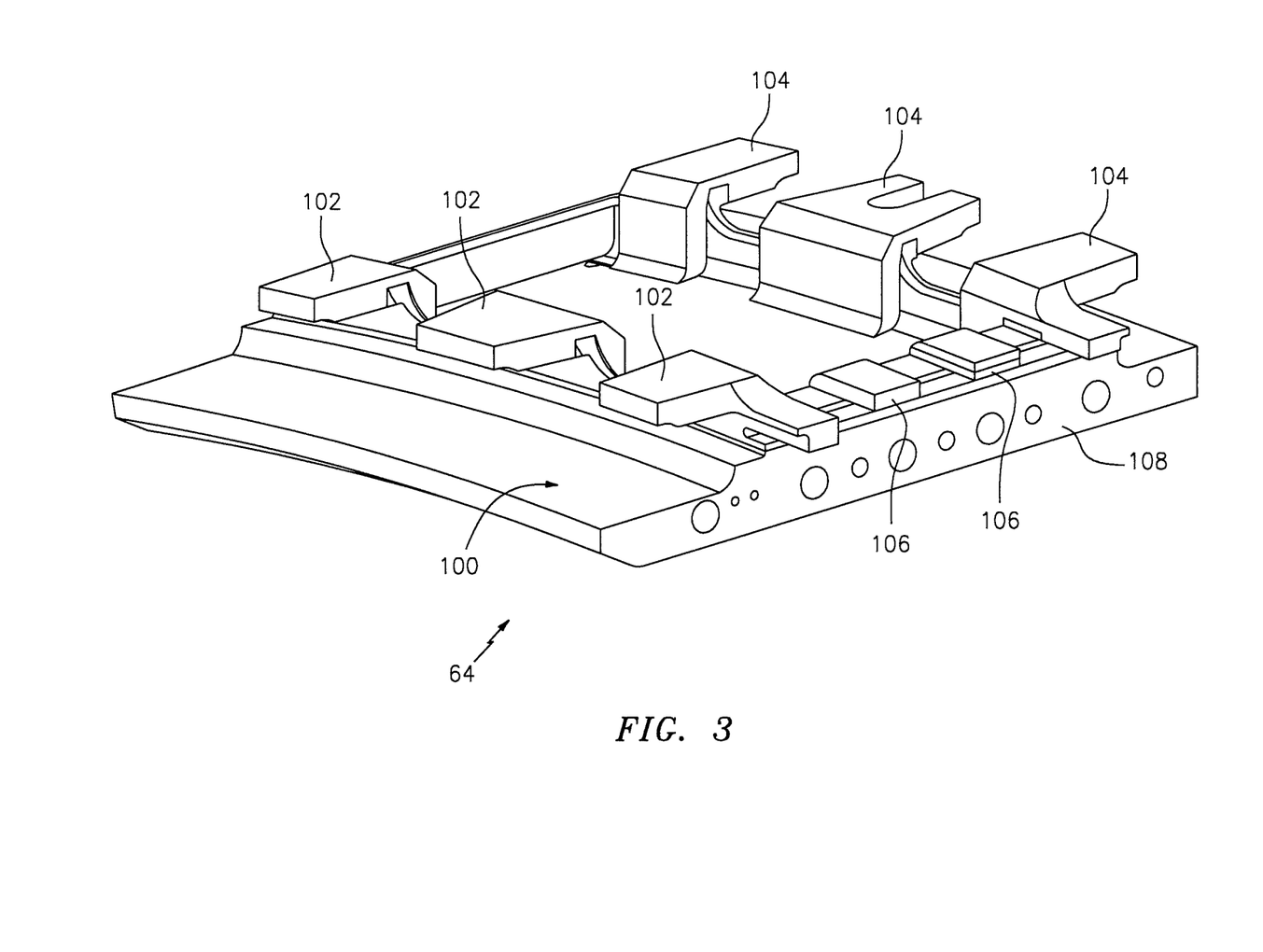
FIG. 3 is a perspective view of one BOAS.

With reference to FIG. 3, each BOAS 64 includes a body 100, a multiple of forward lugs 102 (three shown), a multiple of aft lugs 104 (three shown) and a multiple of shiplap tabs 106 transverse to the lugs 102, 104 (two shown). The BOAS 64 is typically manufactured of, for example, a Nickle Alloy.

The shiplap tabs 106 provide a circumferential interface between adjacent BOASs 64 in the BOAS assembly 62 and extend beyond a sidewall 108 of the body 100 but are otherwise generally non-structural. That is, the shiplap tabs 106 provide for location rather than support.

Figure 4:
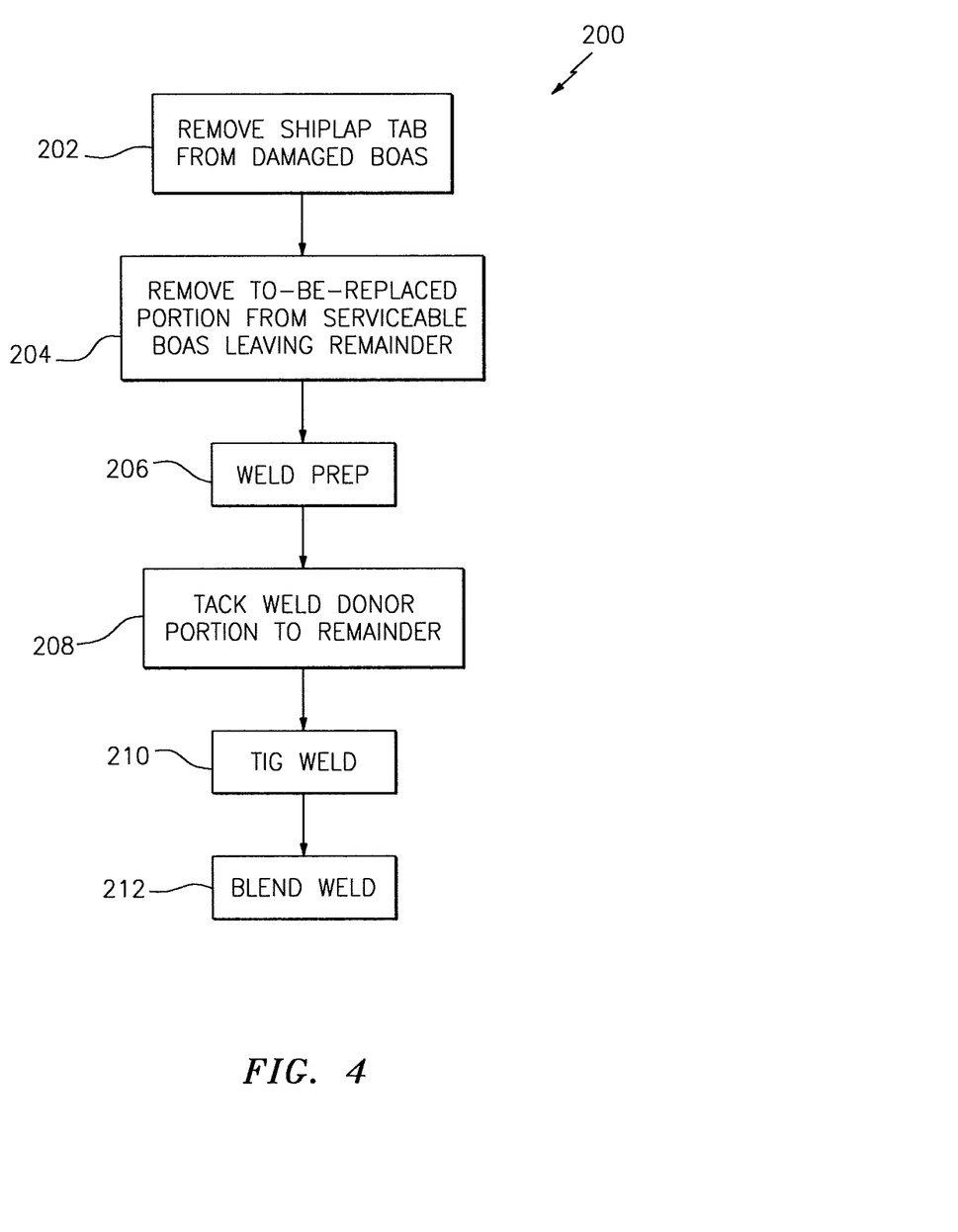
FIG. 4 is a flowchart illustrating a method to repair/remanufacture a BOAS.
Figure 5:
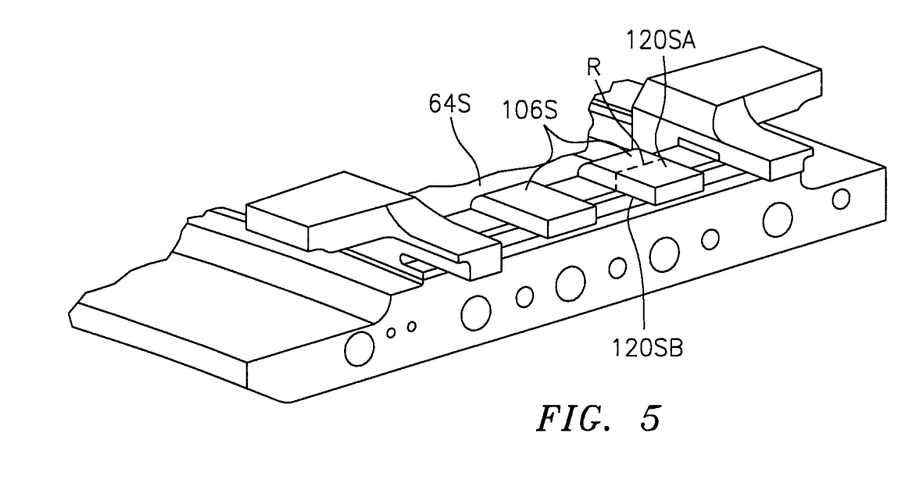
FIG. 5 is a perspective view of an unserviceable BOAS which provides an example donor portion according to one step of the method to repair/remanufacture illustrated in FIG. 4.

With reference to FIG. 4, one disclosed non-limiting embodiment of a repair method 200 initially includes removal of either or both shiplap tabs 106S from a damaged BOAS 64S (step 202; FIG. 5). That is, the damaged BOAS 64S is, although damaged and no longer fit for service, still has one or more serviceable shiplap tabs 106S. These shiplap tabs 106S provide one or more donor portions 120 (FIG. 6) for a repaired/remanufactured serviceable BOAS 64N. It should be appreciated that although the shiplap tabs 106S are utilized to provide donor portions, other portions such as the lugs 102, 104 as well as other components will also benefit herefrom.

Figure 6:
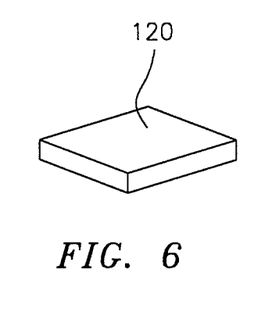
FIG. 6 is a perspective view of the example donor portion.

In one disclosed non-limiting embodiment, the donor portion 120 is a rectilinear section removed from a top portion 120SA of the shiplap tab 106S. The top portion 120A in this example is the portion opposite the body 100 and may first have a bottom portion 120SB ground away prior to the top portion 120SA being cut off at line R. Again, it should be appreciated that various shapes for the donor portion 120 will also benefit herefrom.

Figure 7:
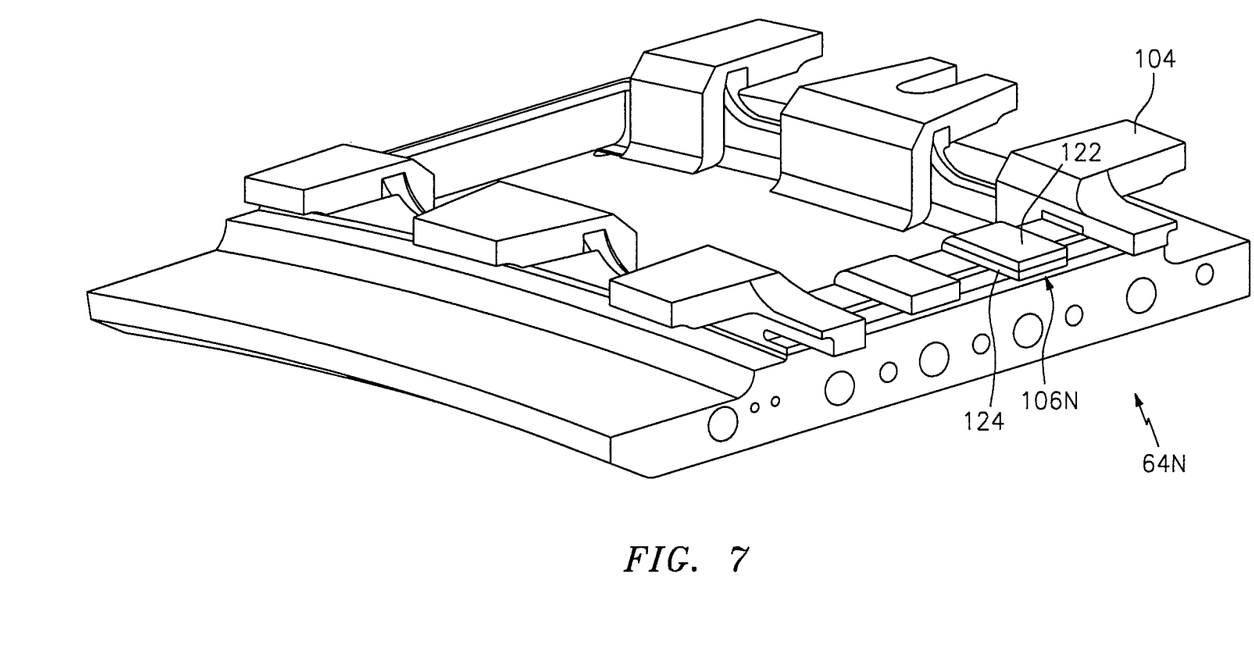
FIG. 7 is a perspective view of a serviceable BOAS which receives the example donor portion according to one step of the method to repair/remanufacture illustrated in FIG. 4.
Figure 8:
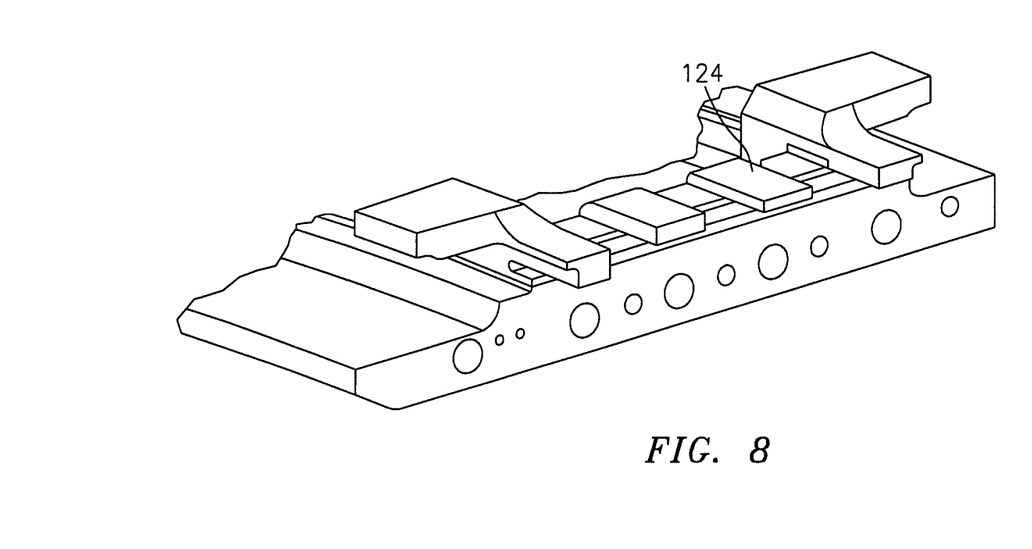
FIG. 8 is a perspective view of the serviceable BOAS with a remainder to receive the example donor portion according to one step of the method to repair/remanufacture illustrated in FIG. 4.

The serviceable BOAS 64N is initially manufactured in a manner similar to that of an OEM component. That is, the serviceable BOAS 64N may be initially taken from original manufacture or otherwise serviceable stocks. A to-be-replaced portion 122 generally equivalent to the donor portion 120 is then removed from the shiplap tab 106N of the serviceable BOAS 64N (step 204; FIG. 7). Machining, grinding or other operation may be used to remove the to-be-replaced portion 122. In this disclosed non-limiting embodiment, the to-be-replaced portion 122 is a rectilinear section removed from the top portion 106A of the shiplap tab 106 leaving a remainder 124 of the shiplap tab 106N (FIG. 8). The remainder 124 in this example is a bottom portion of the shiplap tab 106N.

The remainder 124 of the shiplap tab 106N and the donor portion 120 may then be weld prepped (step 206). Weld preparation includes, but is not limited to, for example, degreasing, fluoride-ion cleaning, grit blast, hydrogen furnace clean, vacuum clean and/or others.

Figure 9:
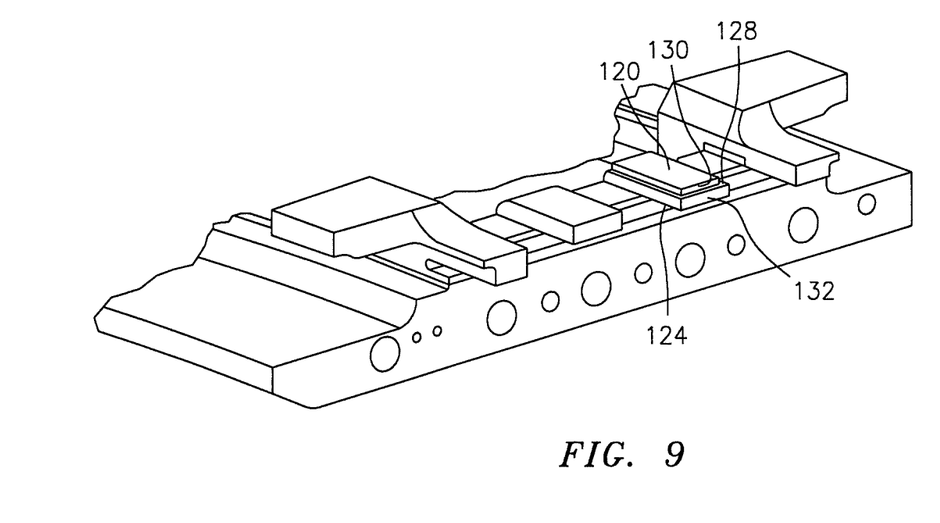
FIG. 9 is a perspective view of the serviceable BOAS with the example donor portion tack welded to the remainder according to one step of the method to repair/remanufacture illustrated in FIG. 4.

Next, the donor portion 120 is tack welded to the remainder 124 of the shiplap tab 106N (step 208; FIG. 9). As the donor portion 120 is essentially the top portion of the remainder 124, but from the donor BOAS 64S, the donor portion 120 is located on the remainder 124 to essentially form a raised platform with a step surface 128 formed around a perimeter 130 thereof (FIG. 9). In other words the donor portion 120 forms the perimeter 130 which is smaller than a perimeter 132 of the remainder 124 of the shiplap tab 106N. For example, the step surface 128 is about 0.020 inches (0.5 mm) wide around the perimeter 130.

Figure 10:
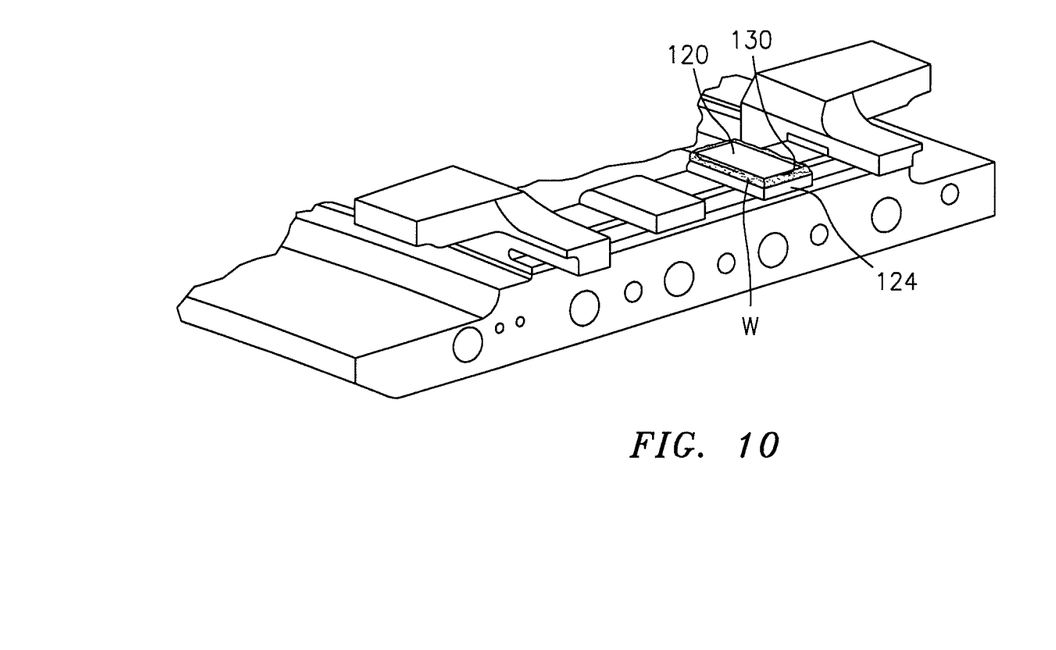
FIG. 10 is a perspective view of the serviceable BOAS with the example donor portion welded around a perimeter thereof to the remainder according to one step of the method to repair/remanufacture illustrated in FIG. 4.

The step surface 128 thereby forms an effective surface to receive a weld W such as a TIG weld around the perimeter 130 to securely weld the donor portion 120 to the remainder 124 of the shiplap tab 106N (step 210; FIG. 10). It should be appreciated that various welds may be alternatively or additionally provided as the shiplap tab 106N in this example is non-structural.

Figure 11:
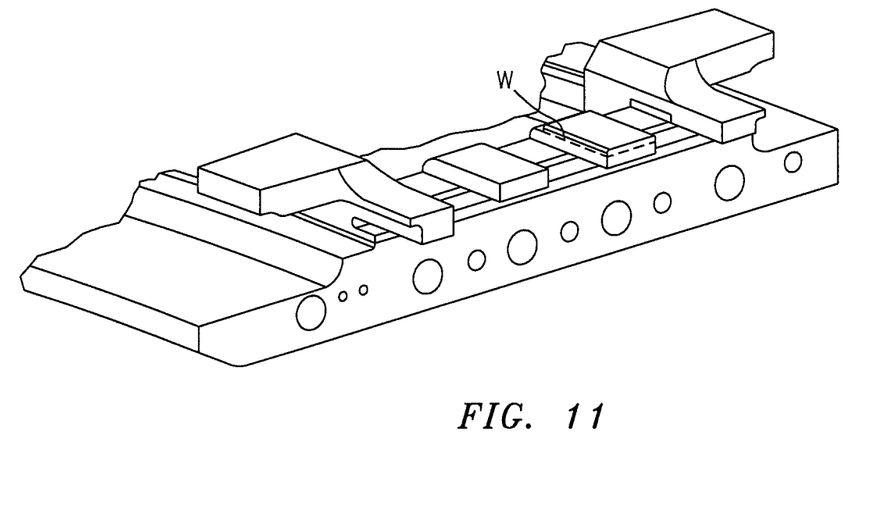
FIG. 11 is a perspective view of the serviceable BOAS with the example donor portion blended to the remainder according to one step of the method to repair/remanufacture illustrated in FIG. 4.

Finally, the weld W may be blended and coated to form a desired profile which is generally equivalent to the original shiplap tab 106N (step 212; FIG. 11). The blend may be performed by hand or by machine operation. This completes the repair with the part to a "like new condition."

The method 200 provides a repair to but a small portion of the component with the remainder being identical to an OEM component. This Nickle Alloy Repair also facilitates a relatively rapid repair.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A method of remanufacturing a turbine component, comprising:
    removing a donor portion from a damaged component;
    removing a to-be-replaced portion from a serviceable component generally equivalent to the donor portion leaving a remainder; and
    welding the donor portion to the remainder;
    wherein damaged component comprises a damaged seal and the donor portion consists of a portion of a tab from the damaged seal;
    wherein the serviceable component comprises a serviceable seal that includes
        a portion of a first tab projecting out from the serviceable seal in a first direction; and
        a second tab projecting out from the serviceable seal in the first direction;
    wherein the welding comprises welding the portion of the tab from the damaged seal to the portion of the first tab;
    wherein the serviceable seal further includes a plurality of second mounting lugs;
    wherein the plurality of second mounting lugs are arranged along a second end of the serviceable seal and are transverse to the portion of the tab of the serviceable seal; and
    wherein the second end is opposite the first end.

2. The method as recited in claim 1, wherein the damaged component and the serviceable component are both blade outer air seals.

3. The method as recited in claim 2, wherein the donor portion and the to-be-replaced portion are at least partially taken from shiplap tabs.

4. The method as recited in claim 3, wherein the remainder is at least partially formed by shiplap tab.

5. The method as recited in claim 2, wherein the donor portion is a top portion of a shiplap tab.

6. The method as recited in claim 2, wherein the to-be-replaced portion is a top portion of a shiplap tab.

7. The method as recited in claim 1, further comprising tack welding the donor portion to the remainder and tungsten inert gas welding the donor portion to the remainder after tack welding.

8. The method of claim 1, wherein the portion of the tab of the serviceable seal is arranged on a side of the serviceable seal that extends axially between the first end of the serviceable seal and the second end of the serviceable seal.

9. A blade outer air seal for a gas turbine engine, comprising:
- a serviceable blade outer air seal with a donor portion from a damaged blade outer air seal welded thereto, wherein the donor portion consists of a portion of a first shiplap tab from the damaged blade outer air seal;
- the serviceable blade outer air seal comprising a body, a plurality of lugs and a portion of a second shiplap tab;
- each of the plurality of lugs cantilevered from the body and arranged along a first end of the body;
- the second shiplap tab cantilevered from the body and arranged transverse to each of the plurality of lugs; and
- the portion of the first shiplap tab welded to the portion of the second shiplap tab.

10. The blade outer air seal as recited in claim 9, wherein the donor portion is tack welded and tungsten inert gas welded to the portion of the second shiplap tab.

* * * * *